United States Patent [19]

Shou et al.

[11] Patent Number: 5,452,373
[45] Date of Patent: Sep. 19, 1995

[54] IMAGE VERIFICATION METHOD

[75] Inventors: Guoliang Shou; Sunao Takatori; Makoto Yamamoto, all of Tokyo, Japan

[73] Assignee: Yozan Inc., Tokyo, Japan

[21] Appl. No.: 112,983

[22] Filed: Aug. 30, 1993

[30] Foreign Application Priority Data

Aug. 31, 1992 [JP] Japan ................... 4-255572

[51] Int. Cl.⁶ .............................................. G06K 9/62
[52] U.S. Cl. ...................... 382/209; 382/192; 382/205
[58] Field of Search .............. 382/30, 10, 18, 16, 382/54, 52; 358/457, 458; 430/7

[56] References Cited

U.S. PATENT DOCUMENTS

| | | | |
|---|---|---|---|
| 3,412,379 | 11/1968 | Stephens | 382/30 |
| 3,713,099 | 1/2973 | Hemstreet | 382/30 |
| 3,959,771 | 5/1976 | Uno et al. | 382/30 |
| 4,110,737 | 8/1978 | Fahey | 382/30 |
| 4,723,173 | 2/1988 | Tanioka | 358/457 |
| 4,905,294 | 2/1990 | Sugiura et al. | 382/9 |
| 4,941,192 | 7/1990 | Mishima et al. | 382/54 |
| 4,997,733 | 5/1991 | Carleer et al. | 430/7 |
| 5,166,986 | 11/1992 | Mizuoka et al. | 382/51 |

OTHER PUBLICATIONS

Iijima, Taizo, "Theory of Pattern Recognition", Morikita Shuppan Kabushiki Kaisha, pp. 111–130, 1989.

*Primary Examiner*—Joseph Mancuso
*Attorney, Agent, or Firm*—Cushman, Darby & Cushman

[57] ABSTRACT

A plurality of successive pixels of a template and corresponding pixels of an input image inputted into a general purpose image processing hardware. A summation of differences is calculated by the hardware between the corresponding pixels of template and input image, and written into a work memory. An image verification is performed by integrating successive results of the summation for the total area to be verified in high speed utilizing a general purpose image processing hardware, without using a special purpose image processing hardware.

7 Claims, 7 Drawing Sheets

Fig. 3a
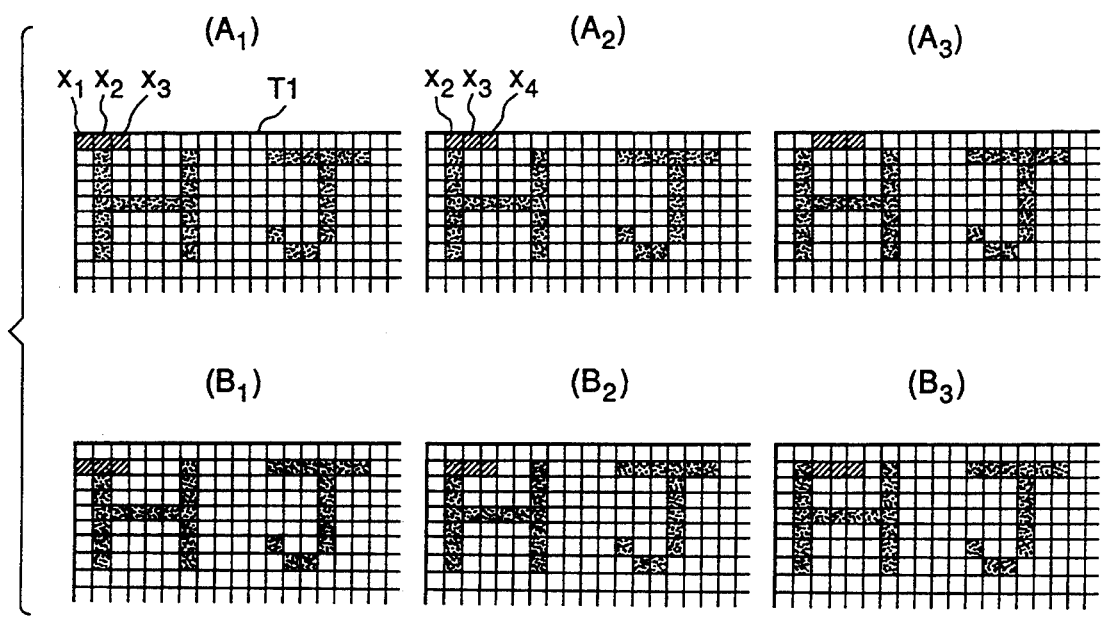
Fig. 3b
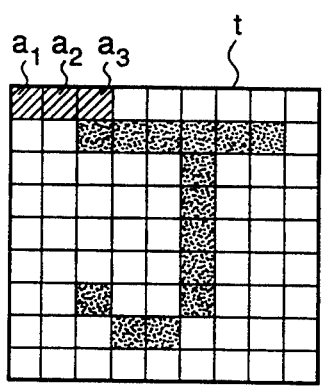
Fig. 3c

Fig. 4a
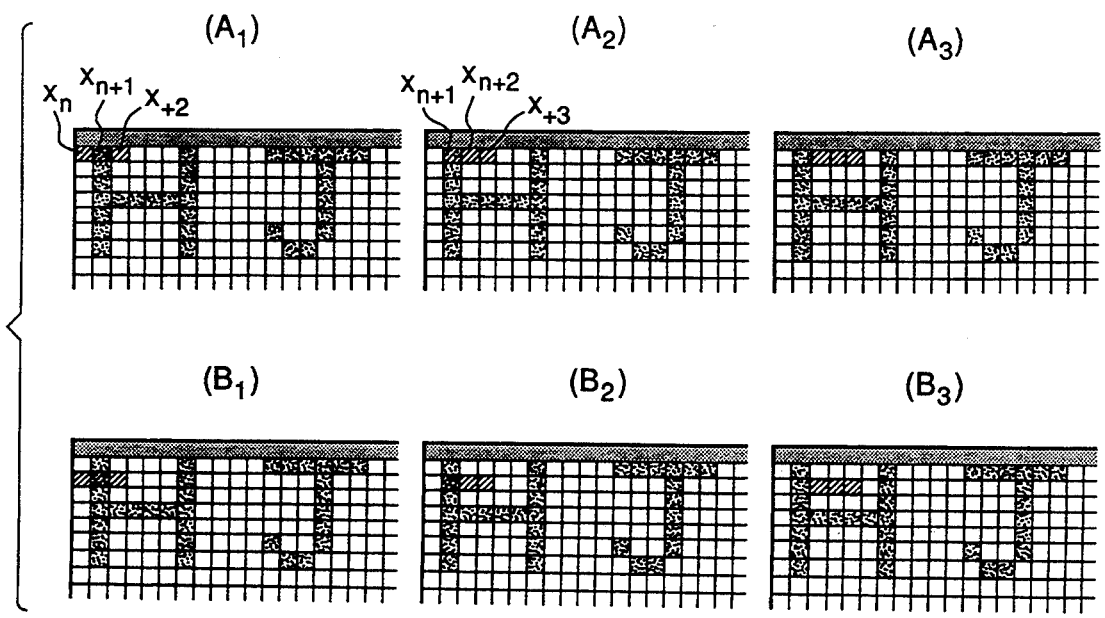
Fig. 4b
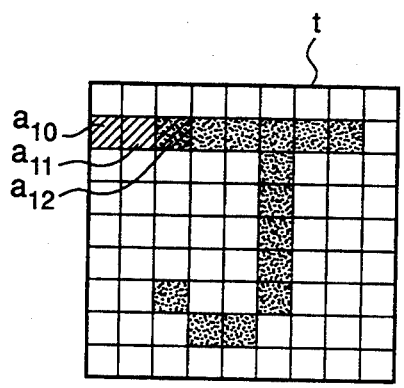
Fig. 4c

Fig. 5a
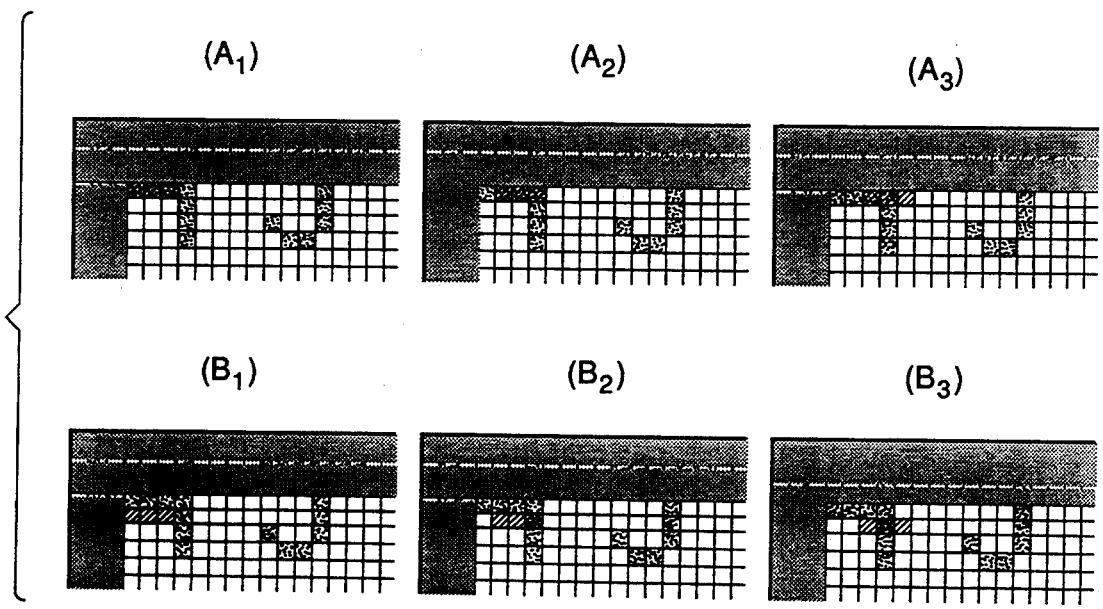
Fig. 5b
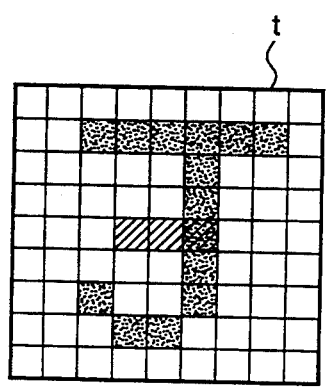
Fig. 5c

*Fig. 8a*
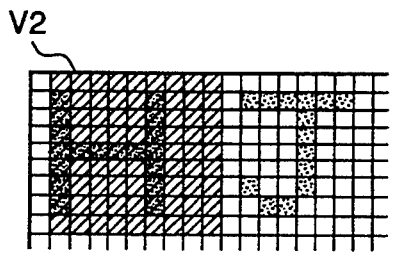
*Fig. 8b*
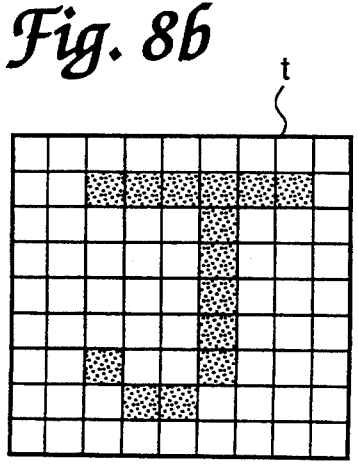
*Fig. 8c*
*Fig. 9a*
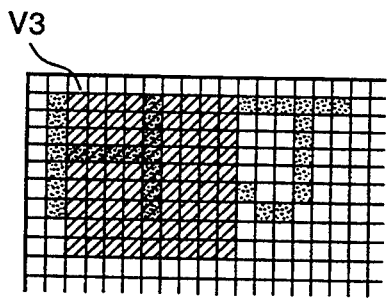
*Fig. 9b*
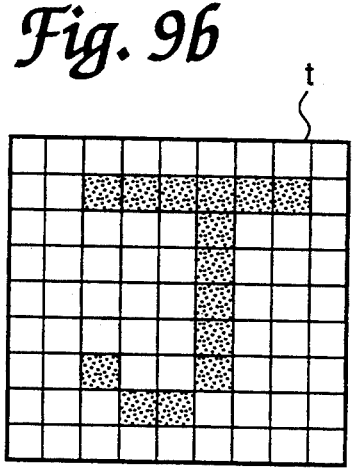
*Fig. 9c*

IMAGE VERIFICATION METHOD

FIELD OF THE INVENTION

This invention relates to an image verification method performing a verification of characters etc., for example, by using an image processing system.

BACKGROUND OF THE INVENTION

Conventionally, it is necessary to design special hardware to perform an image verification by differentiation at high speeds and there is a problem that the production cost of such hardware is very high. An image verification by a software is unavailable for practical inspection because it takes a lot of processing time.

SUMMARY OF THE INVENTION

An image verification method according to the present invention is invented so as to solve the problems with conventional devices and it has an object to provide a method for performing an image verification method at high speed without using special hardware.

According to the image verification method of the present invention, a summation of density difference is calculated between pixels of an input image and a template image by means of a general purpose hardware. The calculation result for a small area that is easily processable by the hardware is stored in a work memory. The total input image is verified by repeating the calculation and storing the result.

BRIEF DESCRIPTION OF THE DRAWINGS

FIGS. 3a-3c illustrate another a convolution of a template, an input image and a work memory-;

FIGS. 4a-4c illustrate another convolution of a template, an input image and a work memory-;

FIGS. 5a-5c illustrate yet another convolution of a template, an input image and a work memory-;

FIGS. 8a-8c illustrate yet another embodiment showing a template, verification area and a work memory in an input image-;

FIGS. 9a-9c illustrate still another embodiment showing a template, verification area and a work memory in an input image-;

PREFERRED EMBODIMENT OF THE PRESENT INVENTION

Hereinafter an embodiment of the present invention is described with referring to the attached drawings.

Figure 11:
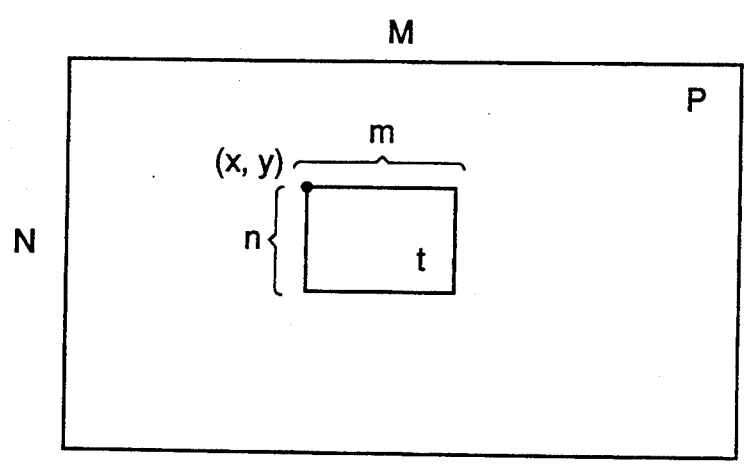
FIG. 11 is a conceptual diagram of a template and an input image-.

In FIG. 11. P is an input image (M×N), t is a template image (m×n), P(i, j) is a density value ($0 \leq i < M$, $0 \leq j < N$) of a pixel at the coordinates (i, j) and t(i, j) is a density value ($0 \leq i < m$, $0 \leq j < n$) of a pixel at the coordinates (i, j). A difference is calculated as the following Formula 1, $$d(i, j | x, y) = | P(x+i, y+j) - t(i, j) | \quad (1)$$

then summation of difference is calculated as the Formula 2.

$$D(x, y) = \sum_{i=0}^{m-1} \sum_{j=0}^{n-1} | P(x+i, y+j) - t(i, j) | \quad (2)$$

$$(0 \leq X \leq M - m, \ 0 \leq y \leq N - n)$$

$$= \sum_{i=0}^{m-1} \sum_{j=0}^{n-1} | d(i, j | x, y) | \quad (3)$$

Figure 12:
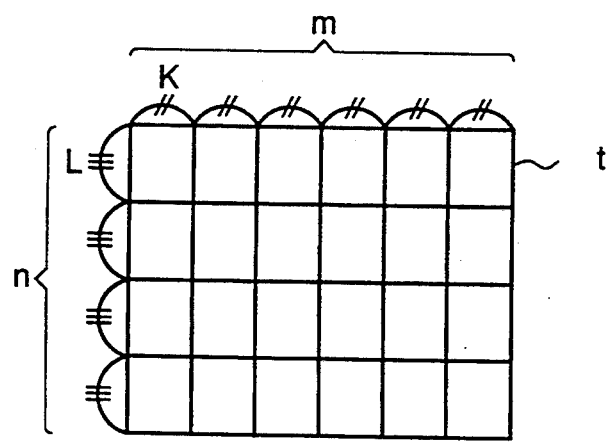
FIG. 12 is a diagram explaining a division of a template.

Dividing the template t of m×n pixels into K×L areas as shown in FIG. 12, the difference is written as the Formula 4.

$$D(x, y) = \sum_{k=0}^{K-1} \sum_{l=0}^{L-1} \sum_{i=k \cdot K}^{(k+1)K-1} \sum_{j=l \cdot L}^{(l+1)L-1} d(i, j | x, y) \quad (4)$$

A sympototic formula for successively calculating D(x, y) above is shown in Formula 5.

$$\left.\begin{aligned}
C(0) &= 0 + \delta(0, 0) \\
C(1) &= C(0) + \delta(0, 1) \\
C(L-1) &= C(L-2) + \delta(0, L-1) \\
&\vdots \\
C(k+1) &= C(k+1-1) + \delta(k, l) \\
&\vdots \\
C(K-1+L-1) &= C(K-1+L-2) + \delta(K-1, L-1)
\end{aligned}\right\} \quad (5)$$

Here, C(K+1) is a constant (summation of products), and δ (k, 1) is a difference between a convolution K×L of a template and an input image P, and the final C(K−1+L−1) becomes D(X, Y).

The calculation of Formula 5 is executed by a hardware as mentioned below.

General image processing hardware, (for example, Image Processing Board TAICHI-CORE by EZEL Inc.) usually has a function of multiplication, addition and subtraction of 3×3 convolution in high speed. The density value of a pixel of a convolution in the template is used as a parameter of the calculation of the hardware. The difference δ (K+1) of Formula 5, that is, a difference of a density value of a pixel of a convolution of a template and an input image, can be calculated at one time processing. Thus, high speed processings can be realized.

A method for finally calculating D(x,y) with hardware after successively calculating a difference δ (k+1) is explained below.

Figure 1:
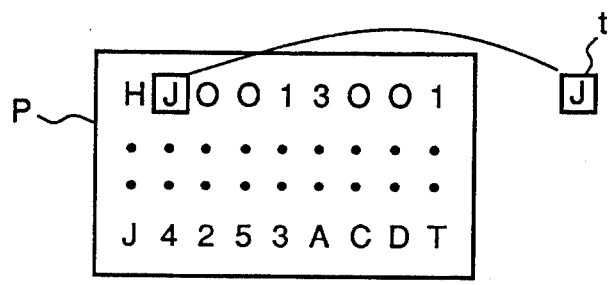
FIG. 1 is a conceptual diagram of an input image and a template.
Figure 2A:
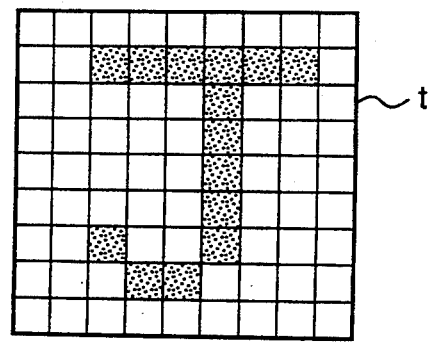
FIGS. 2a and 2b are enlarged diagrams of an image and a template-, respectively.
Figure 2B:
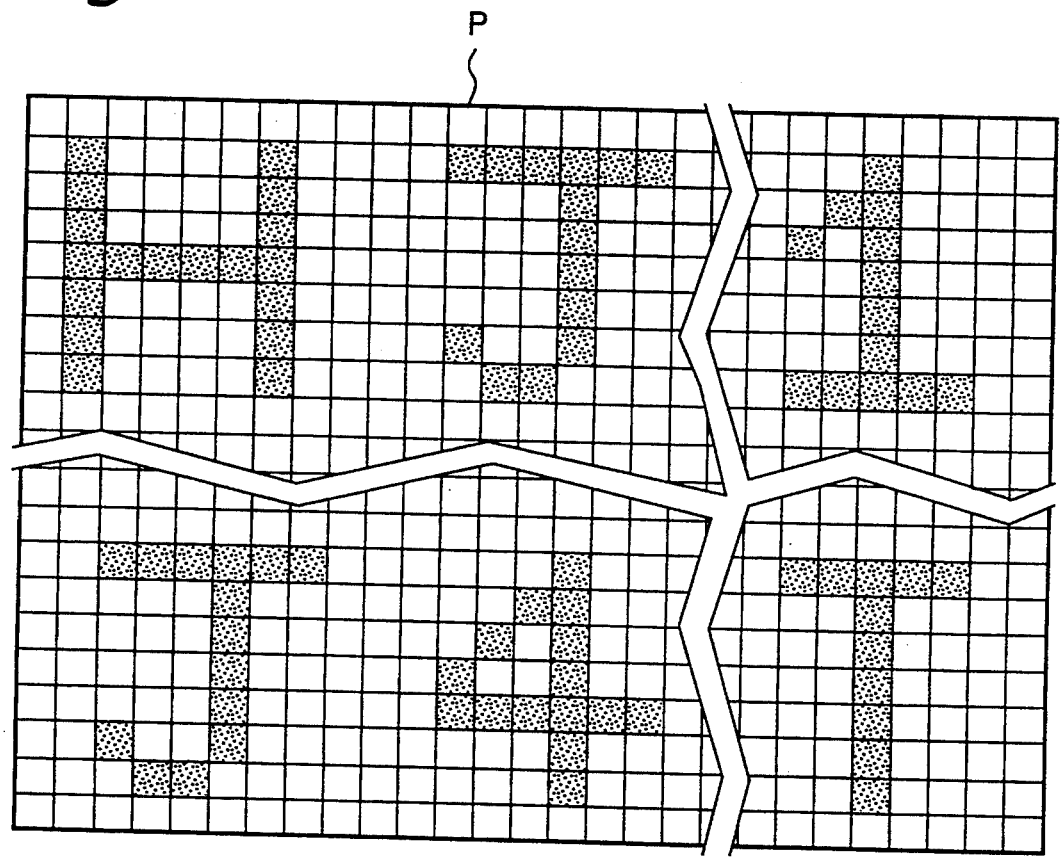

A template t and an input image P with characters to be verified are shown in FIG. 1, and enlarged images thereof is shown in FIGS. 2a and 2b. In the present embodiment, the character of a template t is J, the a size of the template is 9 pixels×9 pixels. The input image P is verified by the template.

In FIGS. 3a–3c illustrate the process for calculating a summation of $D_1(\alpha_1)$ differences between pixels at the corresponding positions in a convolution of a template t. 3 pixels with oblique lines, and their density values are defined as a1, a2 and a3, (See FIG. 3b) and 3 pixels with oblique lines shown in an input image T1, their density values being defined as x1, x2 and x3(See FIG. 3b). The difference is stored in a address of $A_1$ of work memory as shown in FIG. 3c.

The difference $D_1(\alpha_1)$ is calculated as below.

$$Z + |x1-a1| + |x2-a2| + |x3-a3| = D_1(\alpha_1) \quad (6)$$

In Formula 6, Z is a constant. a1, a2 and a3 are the density values of each pixel in the convolution of the template. x1, x2 and x3 are density values of each pixel of an input image.

On calculating a difference between the first convolution in the template and an input image, the constant z is o.

On comparing parameters of Formula 5 with the Formula 6, Z is 0 in Formula 5, $|x1-a1|+|x2-a2|+|x3-a3|$ is $\delta(0,0)$ and $D_1(\alpha_1)$ is $C(0)$.

The difference $D_1(\alpha_2)$ is calculated between 3 pixels with oblique lines of the same template and 3 pixels with oblique lines shown in an input image $A_2$ (it is dislocated by 1 pixel rightwardly from $A_1$) and it is stored in $A_2$ next to $A_1$ of a work memory. In the same way, differences $D_1(\beta_1)$, $D_1(\beta_2)$ and $D_1(\beta_3)$ between 3 pixels with oblique lines shown in input images $B_1$, $B_2$ and $B_3$ and 3 pixels with oblique lines of a template are stored in the addresses $B_1$, $B_2$ and $B_3$ of work memories $B_1$, $B_2$ and $B_3$.

The difference are successively calculated between a pixel of a convolution on a predetermined position of a template and a pixel of the convolution with the same size and with an offset by one pixel for the whole input image, and they are stored in a work memory. An image generated on the work memory is defined as $IMD_1$.

The differences are successively calculated between pixels of a convolution on another predetermined position of a template (it does not overlap 3 pixels above the convolution in the predetermined position) and the convolution with the same size and with an offset by one pixel in the whole input image, the calculated difference is added to the data in the work memory. Then, is the image $IMD_1$ and image $IMD_2$ are generated.

In FIGS. 4a–4c, for example, 3 pixels with oblique lines on the template t and a difference of a density value among 3 pixels with oblique lines shown in the input image $A_1$, $A_2$, $A_3$, $B_1$, $B_2$ and $B_3$ (FIG. 4a) are added to the data in a work memory as illustrated in FIG. 4c. The differences are added to $A_1$, $A_2$, $A_3$, $B_1$, $B_2$ and $B_3$ in the work memory and registered in the memory again. $A_1$ work memory is shown by Formula 7.

$$D_1(\alpha_1) + |xn - a10| + |xn+1-a11| + \quad (7)$$

$$|xn+2-a12| = D_2(\alpha_2)$$

In Formula 7, a10, a11 and a12 are density values of each pixel of a convolution of a template, xn, xn+1 and xn+2 are density values of each pixel of an input image. When these values are compared with the parameters in the Formula 5, $D_1(\alpha_2)$ is $C(0)$ in Formula 5.

$|xn-a10|+|xn+1-a11|+|xn+2-a12|$ is $\delta(0,1)$ and $D_2(\alpha_2)$ is $C(1)$.

An image area for which the difference is calculated of an input image changes in response to the change of a position of a convolution of a template. That is, as shown in FIGS. 4a and 4b, when a convolution of a template is positioned on the 2nd line from the top, an image area for calculating a difference of an input image should be 2nd from the top. That is, a pixel on the top (it is drawn by dark on FIG. 4a) is excepted.

When a position of a convolution of a template t has 3 pixels with oblique lines shown by FIG. 5a, the image area for calculating differences between 3 pixels with oblique lines in $A_1$, $A_2$, $A_3$, $B_1$, $B_2$ and $B_3$ does not include 4 pixels from the top and 3 pixels from the right, for example, which are drawn dark.

In an embodiment of the present invention, a convolution (oblique lines) of a template has 3 pixels, so there are 27 groups (9 pixels × 9 pixels/3 pixels = 27 groups). Difference calculation between each convolution and input images are performed 27 times and 27 differences are added to $A_1$, $A_2$ and $A_3$ of a work memory.

A difference calculation for $A_1$ between a pixel of convolutions of 27th template and a pixel of an input image is shown in Formula 8.

$$D_{26}(\alpha_{26}) + |xq - a79| + |xq+1 - a80| + \quad (8)$$

$$|xq+2 - a81| = D_{27}(\alpha_{27})$$

a79, a80 and a81 are pixel values of each pixel of a convolution of a template, and xq, xq+1 and xq+2 are density values of each pixel of an input image.

When these values are compared with parameters in Formula (5), $D_{26}(\alpha_{26})$ is $C(K-1+L-2)$ in Formula 5, $|xq-a79|+|xq+1-a80|+|xq+2-a81|$ is $\delta(K-1, L-1)$, and $D_{27}(\alpha_{27})$ is $C(K-1+L+1)$, that is $D(x, y)$.

Figure 6:
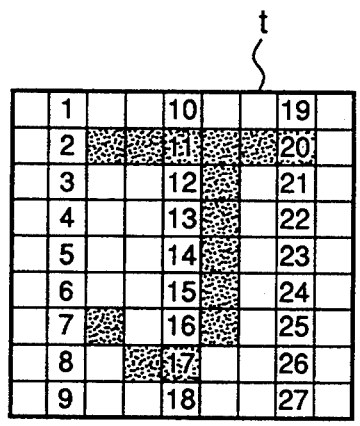
FIG. 6 shows of a template and a convolution-.

As shown in FIG. 6, 27 pairs of convolutions of a template t are surrounded by a thick line, and the difference calculations with an input image are performed from 1st pair to the 27th pair in this embodiment.

As shown in FIGS. 7a–7c, 8a–9c, 9a–9c a difference between a template and each image verification area with the same size as the template in an input image is written in a work memory as a density value.

Figure 7A:
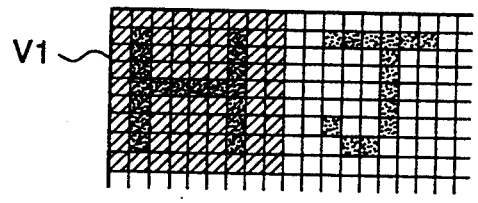
FIGS. 7a-7c illustrate another embodiment of a template, verification area and a work memory in an input image-.
Figure 7B:
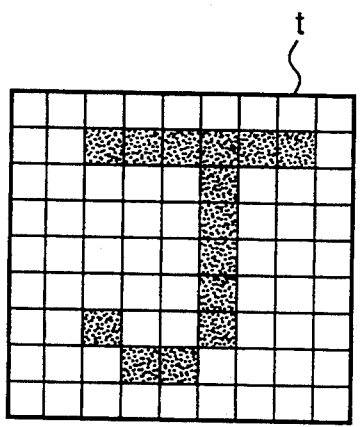
Figure 7C:
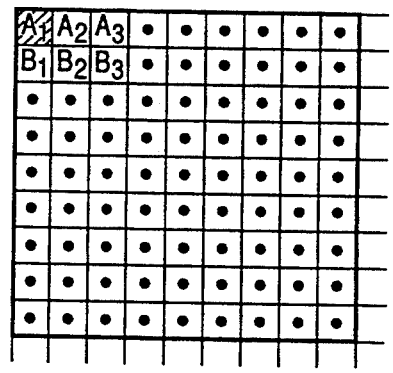

The difference between a template t (FIG. 7b) and a verification area V1 on an input image, which is surrounded by thick oblique lines in FIG. 7a and has a size equal to the size of the template, are thereby integrated in A, of a work memory as shown in FIG. 7c. In the same way, the difference between a template t (FIG. 8b) and a verification area V2 on an input image, which is surrounded by thick oblique lines in FIG. 8a and has a size equal to the size of the template, are thereby integrated in $A_2$ of a work memory as shown in FIG. 8c. The difference between a template t (FIG. 9b) and a verification area V3 on an input image, which is surrounded by thick oblique lines in FIG. 9a and has a size equal to the size of the template, are thereby integrated in $A_3$ of a work memory as shown in FIG. 9c.

Formulas 3 and 4 are explained, concerning the number of times of operation on a hardware. In Formula 3, the number of times of subtraction and summation for calculating the difference summation $D(x, y)$ is as follows.

$$n \times m \times 2 - 1 \quad (9)$$

On the other hand, the number of times of calculation for calculating a difference summation D(x, y) by Formula 4 shown in the embodiment, Formula 5 can calculate δ(k, l) once. So, the calculation times is as follows.

$$\frac{m}{K} \times \frac{n}{L} \tag{10}$$

The ratio of processing time of Formula 3 compared to Formula 4 is calculated as in Formula 11.

$$\frac{n \times m \times 2 - 1}{m \times n} \cdot K \cdot L \approx 2KL \tag{11}$$

In the above embodiment, k=3 and L=1, it is possible to operate in about 6 times faster by using Formula 11 for templates of n=9 and m=9.

Figure 10:
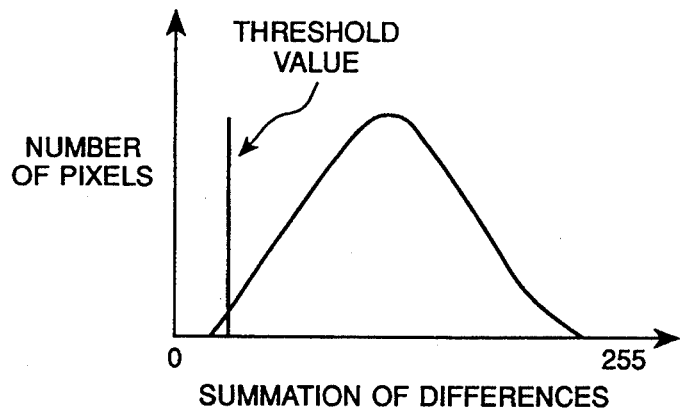
FIG. 10 is a conceptual diagram of a histogram-.

Next, a histogram is calculated of the summation of differences stored in the work memory locations. See FIG. 10. The image in the verification area corresponding to the work memory location wherein the summation of differences stored therein is less than or equal to a prescribed minimum density value is thought to be the same as that shown on the template. If, for example, the template character is "J", then it is desirable to select 7 work memory locations corresponding the summations of density differences that are closest to zero on the histogram. The verification area corresponding to these work memory locations are extracted and verified.

To extract a verification area, the work memory locations corresponding to the 7 summations of density differences closest to zero on the histogram are extracted. Thus, it is 7th possible to process an image at high speed by extracting the coordinates of a verification area corresponding to the work memory locations having summations of differences that are below a prescribed threshold value after binarization.

As mentioned above, an image verification method according to the present invention can express a difference of a verification area with a template by a density value of a pixel, and it can realize an image verification in high speed without using special hardware.

What is claimed is:

1. A image verification method for determining whether an input image corresponds to a template image, comprising the steps of:
    storing densities of pixels of said template image in an image processing apparatus;
    grouping said pixels of said template image into a plurality of convolutions of pixels, wherein each of said convolutions of pixels includes a group of adjacent pixels in said template image and each of said convolutions of pixels does not include pixels included in any other of said convolutions of pixels;
    inputting densities of pixels of said input image corresponding to said pixels of said template image;
    executing a comparing process comprising the steps of:
        detecting differences between densities of pixels in a first of said convolutions of pixels and said densities of corresponding pixels in a first group of pixels in said input image, respectively, and storing a result thereof in a first work memory location,
        detecting differences between said densities of pixels in said first of said convolutions of pixels and said densities of corresponding pixels a second group of pixels in said input image, respectively, said second group of pixels being offset from said first group of pixels in said input image, and storing a result thereof in a second work memory location, and
        continuing to detect differences between said densities of said pixels of said first of said convolutions of pixels and groups of pixels in said input image, respectively until said first of said convolutions of pixels has been compared to all of said groups of pixels in said input image and said results thereof have been stored in corresponding memory locations;
    repeating said comparing process for all other of said convolutions of pixels in said template image, wherein said results of said detecting steps carried out in said comparing process for each of said convolutions are added to said results already stored in said corresponding work memory location such that each of said work memory locations has a density value stored therein that corresponds to a summation of density differences between a template image and a verification area of said input image; and
    determining whether said input image corresponds to said template image based on said density values stored in said work memory locations.

2. An image verification method as defined in claim 1, further comprising the steps of:
    calculating a histogram of said summations of density differences stored in said work memory;
    selecting a predetermined number of said summations of density differences having a value near zero so as to define a threshold value for said summations of density differences;
    binarizing said summations of density differences by said threshold value;
    defining work memory addresses corresponding to said summations of density differences from said binarized data that are not more than said threshold value, so that characters similar to said characters of said template are extracted.

3. An image verification method as defined in claim 2, wherein each of said convolutions of pixels in said template has a 1×N dimension, where N is an integer.

4. The image verification method as defined in claim 3, wherein N is 3.

5. An image verification method of as defined in claim 1, further comprising the steps of:
    selecting a work memory location having a density value that is below a threshold value;
    extracting a portion of said input image corresponding to an area of said input image defined by said verification area corresponding to said selected work memory location.

6. An image verification method as defined in claim 5, wherein each of said convolutions of pixels in said template has a 1×N dimension, where N is an integer.

7. An image verification method as defined in claim 6, wherein N is 3.

* * * * *